United States Patent
Mooney et al.

(10) Patent No.: US 7,233,808 B2
(45) Date of Patent: Jun. 19, 2007

(54) SMART BLUETOOTH INTERFACE GATEWAY TO MATE A NON-BLUETOOTH WIRELESS DEVICE WITH A BLUETOOTH HEADSET

(75) Inventors: Philip D. Mooney, Sellersville, PA (US); Sangeetha Rao, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 560 days.

(21) Appl. No.: 09/945,792

(22) Filed: Sep. 5, 2001

(65) Prior Publication Data
US 2003/0045235 A1    Mar. 6, 2003

(51) Int. Cl.
*H04B 1/38* (2006.01)
*H04M 1/00* (2006.01)

(52) U.S. Cl. .................. 455/557; 455/41.2; 455/556.1; 455/569.1; 455/569.2; 455/344; 455/345

(58) Field of Classification Search .............. 455/550.1, 455/557, 41.1–41.2, 556.1–2, 418, 420, 569.1–2, 455/575.1, 2, 9, 90.1–3, 344–345; 379/420.01–4, 379/454–455; 343/700 MS, 793, 795
See application file for complete search history.

(56) References Cited

U.S. PATENT DOCUMENTS

| | | | | |
|---|---|---|---|---|
| 4,723,265 A | * | 2/1988 | Kamei et al. | 455/564 |
| 5,867,794 A | * | 2/1999 | Hayes et al. | 455/557 |
| 5,898,920 A | * | 4/1999 | Jacobs | 455/553.1 |
| 6,337,666 B1 | * | 1/2002 | Bishop | 343/795 |
| 6,377,218 B1 | * | 4/2002 | Nelson et al. | 343/702 |
| 6,433,512 B1 | * | 8/2002 | Birkler et al. | 320/132 |
| 6,549,792 B1 | * | 4/2003 | Cannon et al. | 455/550.1 |

FOREIGN PATENT DOCUMENTS

WO        WO 02/080470       * 10/2002

* cited by examiner

*Primary Examiner*—Matthew D. Anderson
*Assistant Examiner*—Tuan Tran

(57) ABSTRACT

A smart BLUETOOTH interface gateway device that allows a BLUETOOTH headset to establish an audio connection and communicate with a conventional wireless phone (e.g., a wireless phone that does not have BLUETOOTH installed). In accordance with the principles of the present invention, the connection is controlled merely by monitoring the presence of sound and tones in the audio stream from an analog audio jack of a conventional wireless phone. The smart BLUETOOTH interface gateway device preferably attaches to the wireless phone just as a wired headset would. Use of the wireless phone is the same as if a wired headset were plugged in.

20 Claims, 5 Drawing Sheets

PROTOCOL MODEL

INCOMING AUDIO CONNECTION ESTABLISHMENT

SMART BLUETOOTH INTERFACE GATEWAY TO MATE A NON-BLUETOOTH WIRELESS DEVICE WITH A BLUETOOTH HEADSET

BACKGROUND OF THE INVENTION

1. Field of the Invention

This invention relates generally to piconet wireless networks. More particularly, it relates to a more secure pairing process in a piconet network such as a BLUETOOTH™ type piconet network.

2. Background

Piconets, or small wireless networks, are being formed by more and more devices in many homes and offices. In particular, a popular piconet standard is commonly referred to as a BLUETOOTH™ piconet. Piconet technology in general, and BLUETOOTH technology in particular, provides peer-to-peer communications over short distances.

The wireless frequency of the piconets may be 2.4 GHz as per BLUETOOTH standards, and/or typically have a 20 to 1000 foot range. The piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH™ protocols BLUETOOTH network technology may be utilized to implement a wireless piconet network connection (including scatternet). The BLUETOOTH standard for wireless piconet networks is well known, and is available from many sources, e.g., from the web site www-.bluetooth.com.

Conventionally, analog headsets were used with wireless phones. Analog headsets are wired directly into the audio path of wireless phone. However, more recently, BLUETOOTH technology has permitted the addition of BLUETOOTH functionality and communication between a wireless phone and a wireless headset.

The Headset Profile of the BLUETOOTH specification, version 1.1, Part K:6, available at www.bluetooth.com, provides the framework for conventional BLUETOOTH communications between a wireless BLUETOOTH phone and a wireless BLUETOOTH headset.

FIG. 4 shows the protocols and entities regarding how a BLUETOOTH headset interacts with a wireless BLUETOOTH phone acting as an audio gateway to provide a wireless hands free connection for a wireless phone (e.g., a cell phone).

In particular, FIG. 4 shows the protocol model of both an audio gateway 502 and a BLUETOOTH headset 504. "Audio gateway" refers to a wireless BLUETOOTH phone 502 in the given example. The audio gateway 502 is the gateway for both input audio and output audio. The BLUETOOTH headset is the device which acts as the audio gateway's remote audio input and output mechanism.

The baseband 524, 534, LMP 522, 536 and L2CAP 528, 532 are the OSI layer 1 and 2 BLUETOOTH protocols. RFCOMM 520, 538 is the BLUETOOTH adaptation of GSM TS 07.10. SDP 526, 530 is the BLUETOOTH service discovery protocol.

Headset control 512, 516 is the entity responsible for headset specific control signaling. The headset specific control signaling is AT command based.

The audio port emulation application layer 510 in the wireless BLUETOOTH phone 502 is the entity which emulates the audio port on the wireless phone, and the audio driver application 514 is the driver software in the BLUETOOTH headset 504.

The audio gateway 502 and BLUETOOTH headset 504 provide serial port emulation. For the serial port emulation, RFCOMM 520, 538 is used. The serial port emulation is used to transport the user data including modem control signals and AT commands from the BLUETOOTH headset 504 to the audio gateway 502. AT commands are parsed by the audio gateway 502 and responses are sent to the BLUETOOTH headset 504.

The Headset Profile requires mandatory control requirements for a BLUETOOTH headset audio gateway. FIG. 5 depicts the conventional establishment of a connection with respect to an incoming call.

In particular, as shown in step 602 of FIG. 5, the wireless BLUETOOTH phone 502 initiates connection establishment with the BLUETOOTH headset 504.

In step 604, once the connection is established between the wireless BLUETOOTH phone 502 and the BLUETOOTH headset 504, the wireless BLUETOOTH phone 502 sends an unsolicited result code RING to alert the user of the BLUETOOTH headset 504. Optionally, the wireless BLUETOOTH phone 502 may provide an in-band ringing tone as shown in step 608 (which would then be sent after step 606). The ring signal may be repeated as depicted in steps 610, 612 for as long as the connection establishment is pending.

In step 606, SCO link establishment is initiated by the wireless BLUETOOTH phone 502.

In step 614, the user may accept the incoming audio connection by pressing a button on the BLUETOOTH headset 504. When the user accepts the incoming call, the BLUETOOTH headset 504 will send an AT+CKPD command to the wireless BLUETOOTH phone 502.

In step 616, the wireless BLUETOOTH phone 502 sends an OK acknowledgement back to the BLUETOOTH headset 504.

In step 618, the wireless BLUETOOTH phone 502 establishes the SCO link (if not established earlier in step 606).

Thus, the BLUETOOTH specification as defined by the BLUETOOTH special interest group (SIG) requires certain control information (e.g., relating to onhook, offhook, etc.) to be communicated in a digital path from a wireless BLUETOOTH phone 502, forcing the wireless BLUETOOTH phone (or other device) to have a priori knowledge of the existence of BLUETOOTH in the device.

This means that for most wireless phones, adding the ability to communicate with a BLUETOOTH headset requires integrating a BLUETOOTH stack into the wireless phone.

Some wireless phones (e.g., the model T28 commercially available from ERICSSON™) have a complex interface that allows the after-manufacture addition of a BLUETOOTH communication module without requiring updates to the software in the wireless phone. However, most conventional wireless phones do not have such a sophisticated interface.

Moreover, commercially available headsets for most older wireless phones are not wireless. Rather, these conventional wireless phones merely have a jack allowing the addition of only a wired headset. As an example, the model 5160 commercially available from NOKIA™ may include a wired headset that includes a button to answer an incoming call.

There is a need for apparatus and methods which allow a BLUETOOTH headset to communicate with an otherwise conventional wireless phone, without requiring the use of a wireless BLUETOOTH phone already including a BLUETOOTH communication module. This would provide users of older wireless phones the ability to use a wireless headset by allowing a BLUETOOTH headset to be used with non-BLUETOOTH enabled wireless phones.

SUMMARY OF THE INVENTION

In accordance with the principles of the present invention, a device to enable BLUETOOTH communications between a wireless BLUETOOTH headset and a non-BLUETOOTH enabled wireless audio device comprises a BLUETOOTH front end, and a connection between an audio path from the wireless audio device and the BLUETOOTH front end. An activity detector senses audio activity output by the wireless audio device.

A method of terminating a call between a BLUETOOTH headset and a wireless phone in accordance with another aspect of the present invention comprises detecting an end of a call by detecting a termination of audio activity on an audio path from a wireless phone. A signal is transmitted relating to the termination of the call to a BLUETOOTH headset.

A method of initiating the establishment of a BLUETOOTH audio channel between a BLUETOOTH headset and a wireless audio device in accordance with yet another aspect of the present invention comprises monitoring an audio channel from the wireless audio device for audible activity, and initiating the establishment of the audio channel based on the detection of audible activity.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a smart BLUETOOTH interface gateway device that allows a BLUETOOTH headset to establish an audio connection and communicate with a conventional wireless phone (e.g., a wireless phone that does not have BLUETOOTH installed). In accordance with the principles of the present invention, the connection is controlled merely by monitoring the presence of sound and tones in the audio stream from an analog audio jack of a conventional wireless phone.

The smart BLUETOOTH interface gateway device preferably attaches to the wireless phone just as a wired headset would. Moreover, use of the wireless phone is the same as if a wired headset were plugged in.

Figure 1:
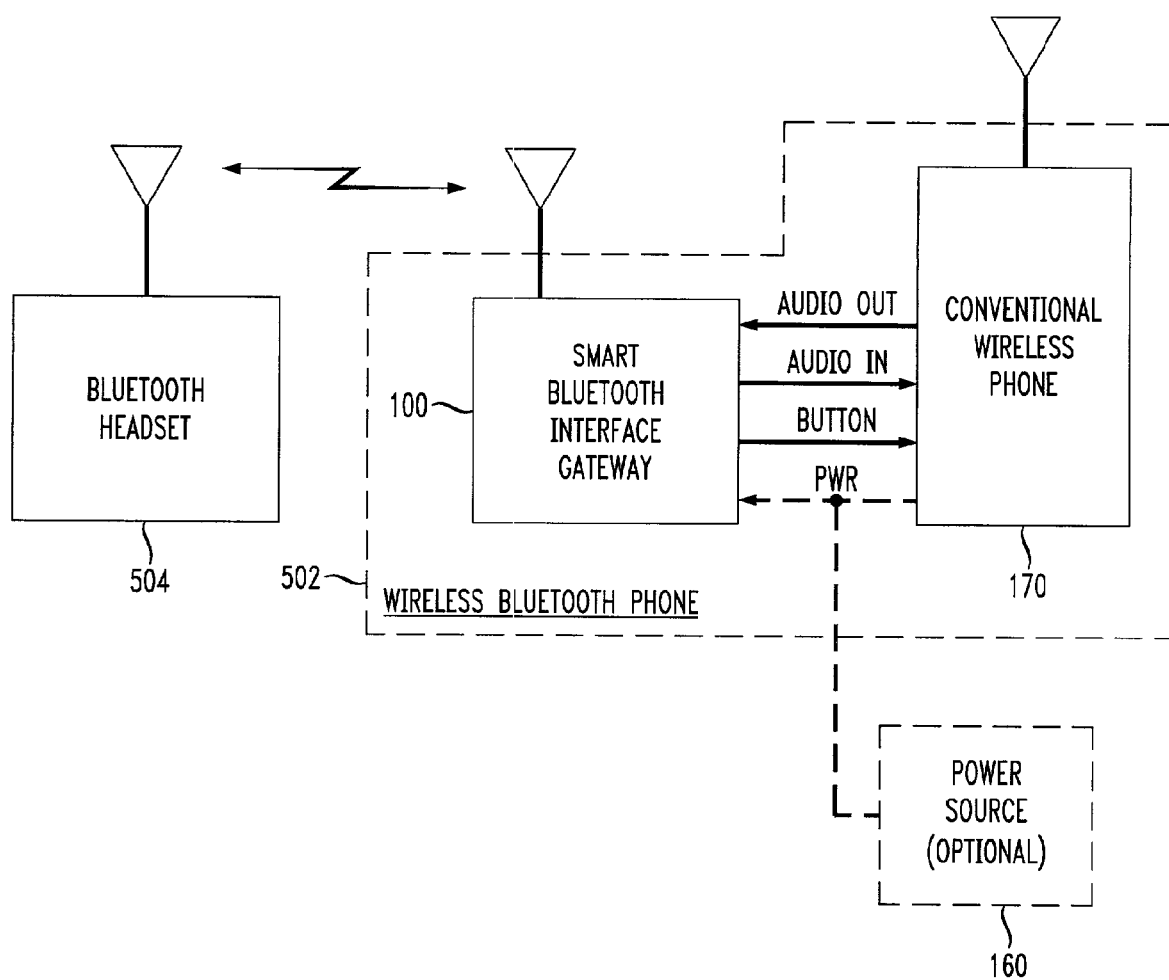
FIG. 1 shows a BLUETOOTH headset paired with a wireless BLUETOOTH phone comprising a conventional wireless phone connected to a smart BLUETOOTH interface gateway, in accordance with the principles of the present invention.

FIG. 1 shows a BLUETOOTH headset paired with a wireless BLUETOOTH phone comprising a conventional wireless phone connected to a smart BLUETOOTH interface gateway, in accordance with the principles of the present invention.

In particular, as shown in FIG. 1, an otherwise conventional BLUETOOTH headset 504 is capable of communications with an otherwise conventional wireless phone 170 by adaptation of the wireless phone into a wireless BLUETOOTH phone 502 by the external connection of a smart BLUETOOTH interface gateway 100 in accordance with the principles of the present invention.

The smart BLUETOOTH interface gateway is connected to the AUDIO OUT, AUDIO IN, and BUTTON INDICATOR connectors on the wireless phone 170. Additionally, the smart BLUETOOTH interface gateway 100 may draw power either directly from the wireless phone 170 or from an optional external power source 160 (e.g., from the cigarette lighter of a vehicle).

The smart BLUETOOTH interface gateway 100 may be implemented as a dongle attached to the non-BLUETOOTH otherwise conventional wireless phone 170.

The embodiment of FIG. 1 presumes that along with AUDIO IN and AUDIO OUT that there is also a BUTTON INDICATOR connector externally available on the wireless phone 170, and preferably makes use of a POWER output connector.

Figure 2:
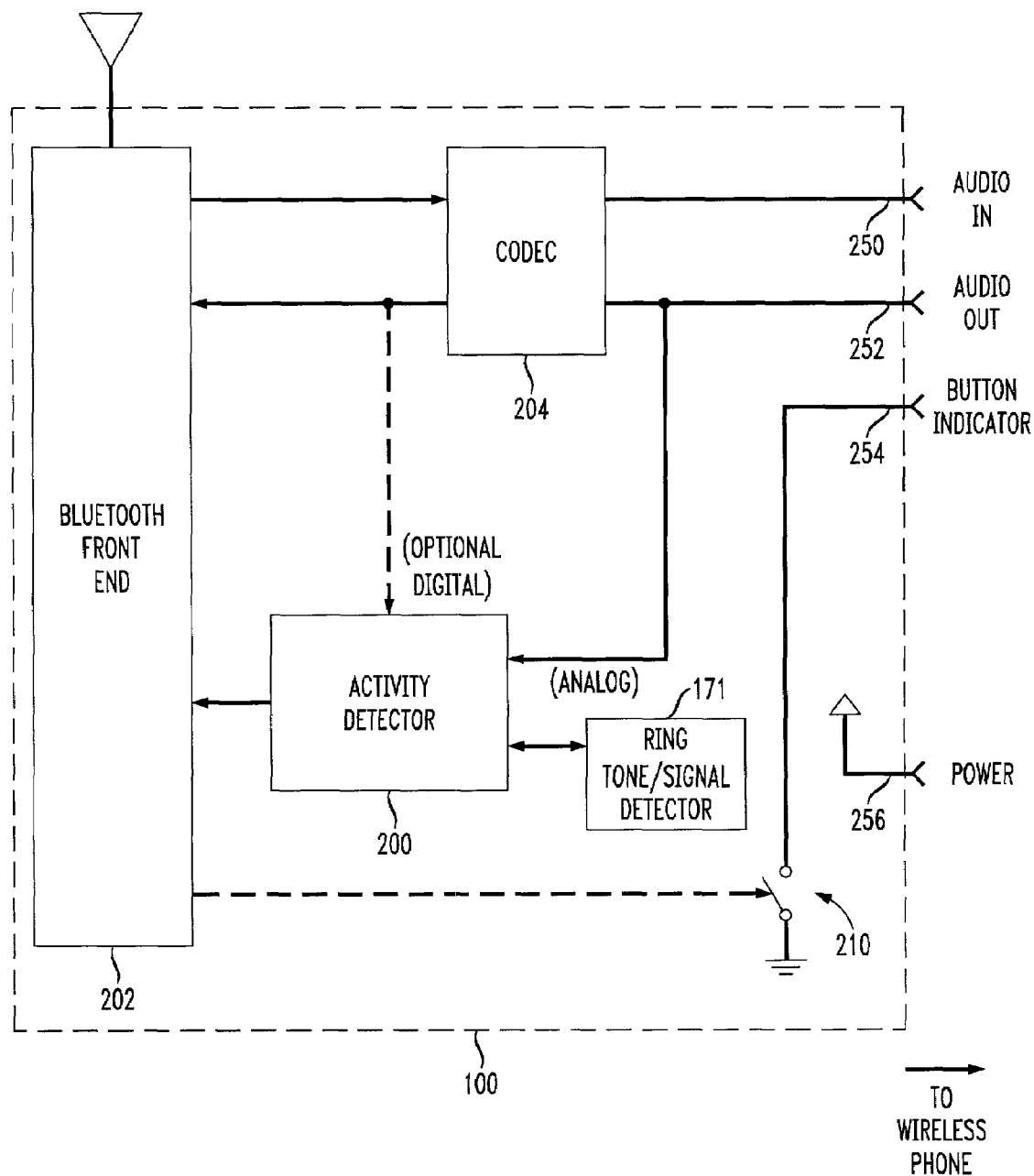
FIG. 2 shows relevant features of the exemplary smart BLUETOOTH interface gateway shown in FIG. 1.

FIG. 2 shows relevant features of the exemplary smart BLUETOOTH interface gateway shown in FIG. 1.

In particular, as shown in FIG. 2, the smart BLUETOOTH interface gateway 100 includes a BLUETOOTH front end 202, a codec or other analog-to-digital audio converting device, an activity detector 200 with ring tone/signal detector 171, and a relay device 210.

The functions of the components of the exemplary smart BLUETOOTH interface gateway 100 will be described with reference to FIG. 3.

Figure 3:
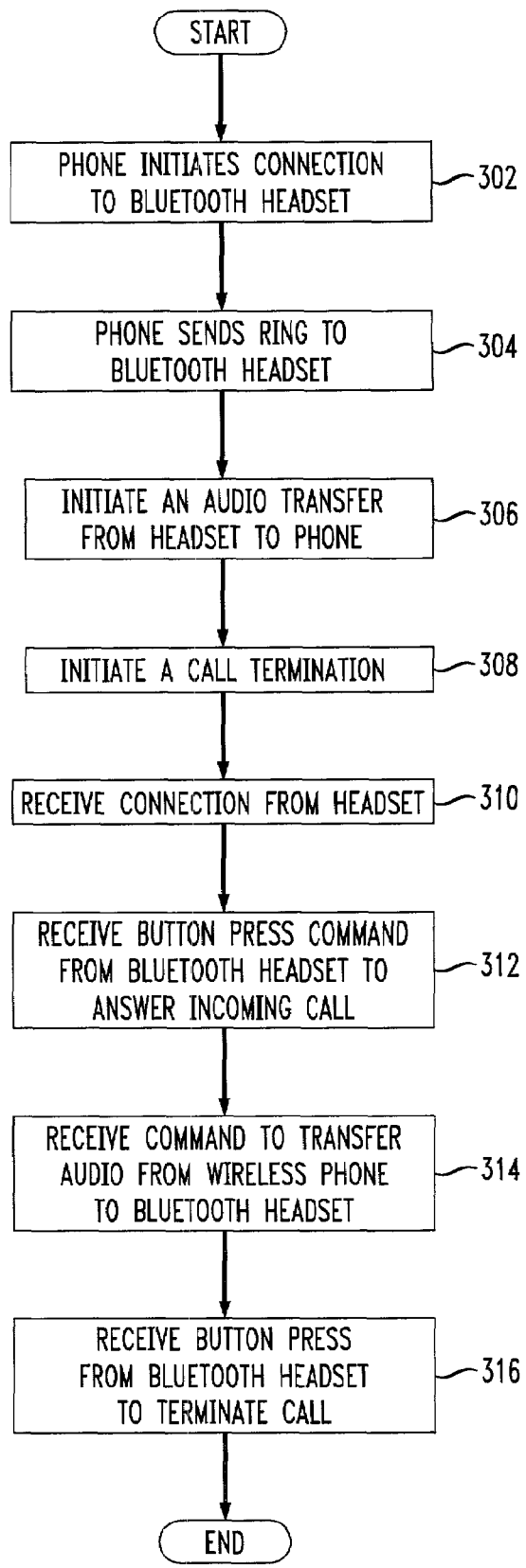
FIG. 3 shows a process by which an incoming call is answered using a BLUETOOTH headset and wireless BLUETOOTH phone including a smart BLUETOOTH interface gateway as shown in FIGS. 1 and 2.
Figure 4:
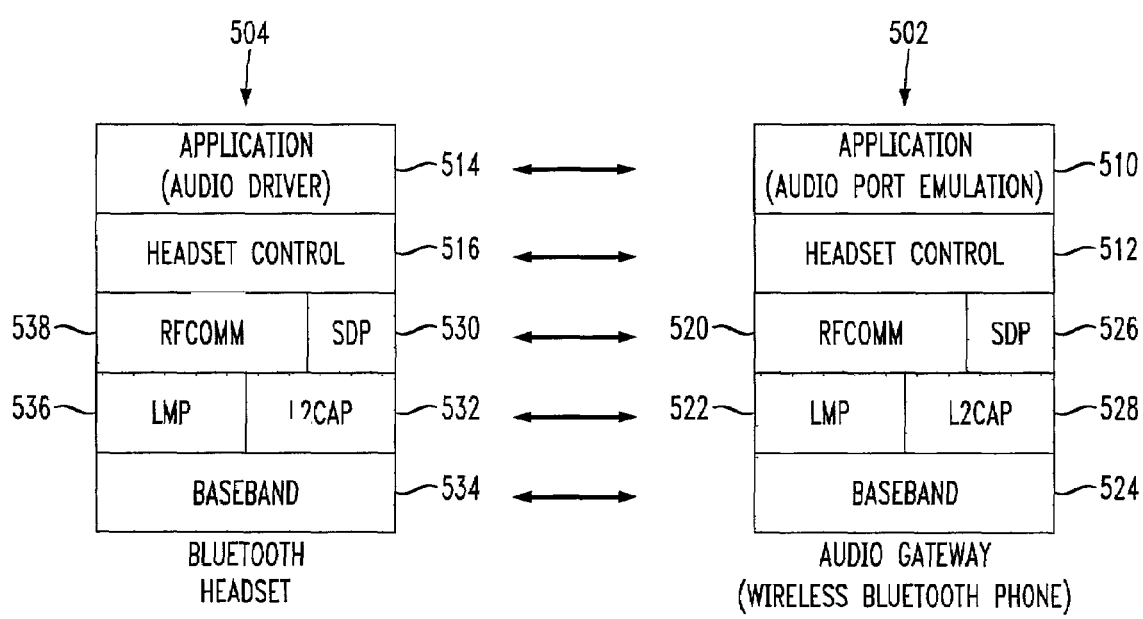
FIG. 4 shows the protocols and entities regarding how a BLUETOOTH headset interacts with a wireless BLUETOOTH phone acting as an audio gateway to provide a wireless hands free connection for a wireless phone (e.g., a cell phone).
Figure 5:
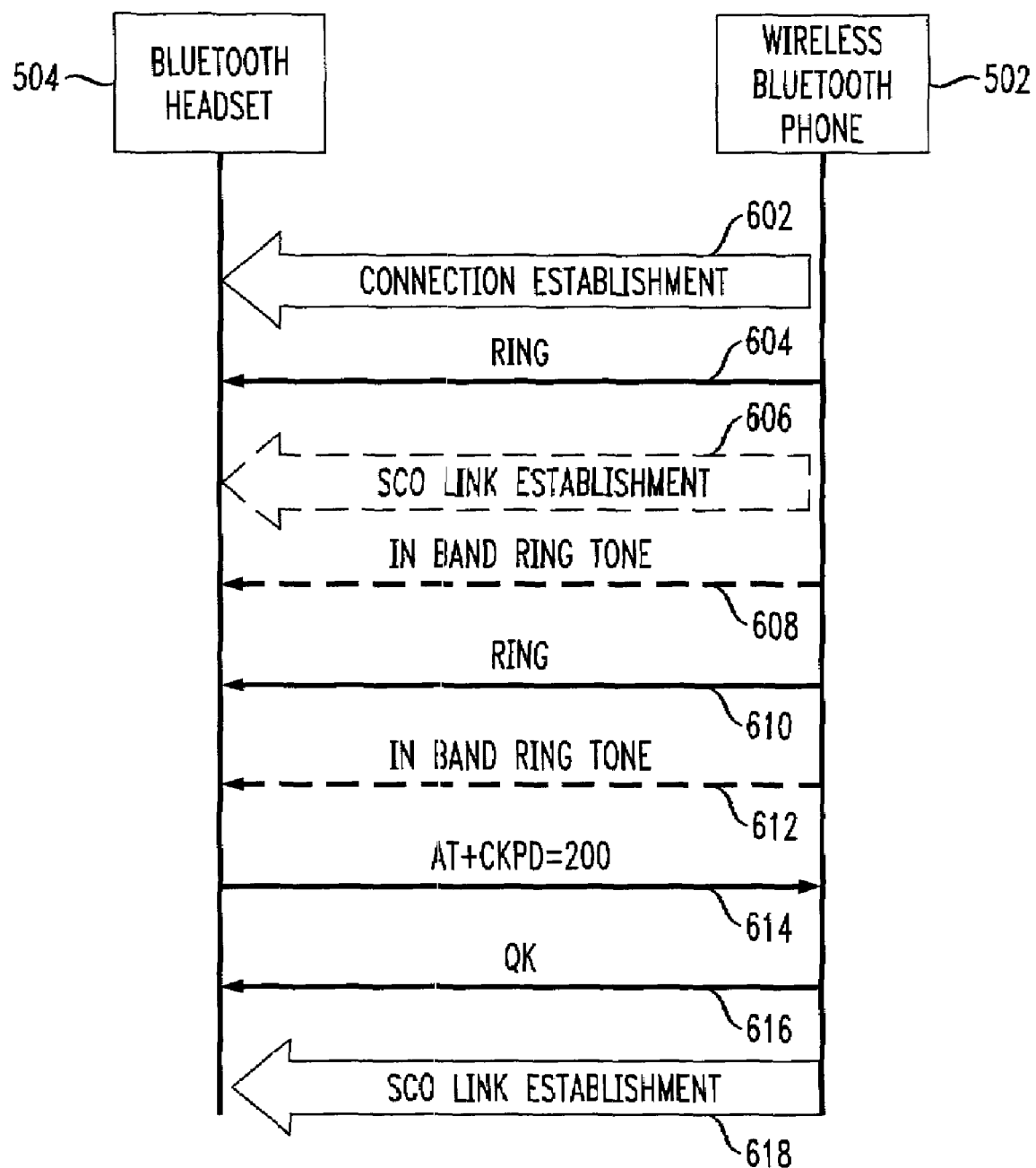
FIG. 5 depicts the conventional establishment of a connection with respect to an incoming call.

FIG. 3 shows a process by which an incoming call is answered using a BLUETOOTH headset and wireless BLUETOOTH phone including a smart BLUETOOTH interface gateway as shown in FIGS. 1 and 2. In particular, FIG. 3 shows an exemplary process by which a hands free BLUETOOTH wireless phone in accordance with the principles of the present invention fulfills the mandatory control requirements for a BLUETOOTH headset audio gateway as described in the Headset Profile, Part K:6 of the BLUETOOTH specification.

In step 302 of FIG. 3, the wireless BLUETOOTH phone 502 initiates a connection to the BLUETOOTH headset 504. The smart BLUETOOTH interface gateway 100 monitors the audio signal coming in from the AUDIO OUT jack 252. The AUDIO OUT jack 252 corresponds to the AUDIO OUT of the wireless phone 170.

When sound activity is detected by the activity detector 200 (preferably whether voice or tones), the BLUETOOTH front end 202 initiates a connection including audio with the BLUETOOTH headset 504. This allows the BLUETOOTH headset 504 to hear voice and/or tones (e.g. from key presses) generated from the wireless phone 170.

In step 304, a ring signal is sent by the smart BLUETOOTH interface gateway 100 to the BLUETOOTH headset 504. As the smart BLUETOOTH interface gateway 100 continues to monitor the audio connection from the wireless phone 170, it preferably also detects the presence of a ring signal with an appropriate ring tone/signal detector 171.

The activity detector 200 and/or ring tone/signal detector 171 may be an appropriate processor, e.g., microprocessor, microcontroller, or digital signal processor (DSP). The ring tone/signal detector 171 may be programmed to detect any one of many different types of ring signals, or just to detect tones in general that are not just key press tones.

Once detected, the BLUETOOTH front end 202 of the smart BLUETOOTH interface gateway 100 generates and sends a ring AT command to the BLUETOOTH headset 504. Since at this point audio has already been connected already in step 302, inband ringing may alternatively or additionally be provided.

In step 306, an audio transfer is initiated from the BLUETOOTH headset 504 to the smart BLUETOOTH interface gateway 100 of the wireless BLUETOOTH phone 502.

Since the wireless phone 171 controls whether audio is connected to its internal speaker and microphone, the smart BLUETOOTH interface gateway 100 may also include the capability to effectively disconnect the audio contacts from the wireless phone 171 (e.g., by implementation of a physical switch between the codec 204/activity detector 200 and the AUDIO IN 250/AUDIO OUT 252 jacks, or more simply by disabling the codec 204) so that the wireless phone 171 thinks that there is no headset attached. Without a headset detected, the wireless phone 171 would presumably then utilizes its internal speaker and microphone.

In step 308, a call termination can be initiated. In particular, most wireless phones and networks add "comfort noise" to the audio signal (usually if no audio signal is detected), thus there may always be some level of signal that can be detected by the activity detector 200 of the smart BLUETOOTH interface gateway 100 during an established call. Thus, the present inventors realized that this 'comfort noise'0 detection can be used to detect the end of a call. Thus, in accordance with the principles of the present invention, when the activity on the audio signal is detected as going silent (i.e., with no comfort sound and/or no voice signal), the end of the call can be presumed. At this presumed end of call, the smart BLUETOOTH interface gateway 100 would disconnect its audio connection from the BLUETOOTH 504 headset, e.g., after a short timeout period.

In step 310, a connection is received from the BLUETOOTH headset. In particular, when the BLUETOOTH headset 504 wants to make a connection, it initiates the BLUETOOTH link and sends the button press AT command. The smart BLUETOOTH interface gateway 100 of the wireless BLUETOOTH phone 502 receives the AT command and translates it into the physical signals that the wireless phone 171 expects for a wired headset button press.

For instance, in the given embodiment, the BLUETOOTH front end 202 may close a relay 210, causing a ground to be applied to the button indicator 254 input of the wireless phone 171.

The smart BLUETOOTH interface gateway 100 also connects the audio path between the wireless phone 171 and the BLUETOOTH headset 504, noting that since many wireless phones do not have voice dialing built in, that connection of the audio path may not accomplish anything substantial.

In step 312, a button press command is received from the BLUETOOTH headset 504 indicating the desire to answer an incoming call to the wireless phone 171. Thus, once the smart BLUETOOTH interface gateway 100 has made a connection to the BLUETOOTH headset 504 and sent the ring AT command, it waits for a button press command back from the BLUETOOTH headset 504. When received, the BLUETOOTH front end 202 of the smart BLUETOOTH interface gateway 100 translates that button press command into the physical signals that the wireless phone 171 expects for a wired headset button press (e.g., a controlled momentary closure of relay 210). In this way, the incoming call is answered.

In step 314, a command is received to transfer audio from the wireless phone 171 to the BLUETOOTH headset 504. If the smart BLUETOOTH interface gateway 100 receives a button press while there is already an ongoing call being handled on the wireless phone 171 (not the BLUETOOTH headset 504), the smart BLUETOOTH interface gateway 100 would re-connect the audio contacts to the phone (e.g., enable the codec 204) so that the wireless phone 171 will transmit analog audio signals to the AUDIO OUT 252 jack, and receive analog audio signals from the AUDIO IN 250 jack.

In step 316, the button press is received from the BLUETOOTH headset 504 to terminate the call. This step functions similarly to step 312. Thus, when the smart BLUETOOTH interface gateway 100 receives a button press command during an ongoing call, the BLUETOOTH front end 202 translates the received button press command into the physical signal(s) that the wireless phone 171 expects for a wired headset button press (e.g., momentary closure of relay 210) to terminate the call.

In another embodiment in accordance with the principles of the present invention, the smart BLUETOOTH interface gateway 100 may accept audio and from the handset plug of a standard wired phone (e.g. an office phone or home phone). In such an embodiment, the base of the wired phone may provide the user with the option of directing the audio signals from an optional wired handset, which in this case has no control capabilities (e.g. dialing, etc.), to a BLUETOOTH headset 504. To allow the user to use either the wired handset or a BLUETOOTH headset 504, the wired phone preferably includes a method of redirecting audio to the smart BLUETOOTH interface gateway 100 when desired. For example, a button such as "Wireless Headset" may be implemented in the base of the wired telephone for selective activation by the user.

In a simple approach, the wired handset being placed in the cradle of the base of the wired phone would still control its switch hook. However, the user could remove the handset from the cradle and place it in such a way as to not hang up the phone (e.g. on the desk top or on a separate cradle). Then, after the user presses the "Wireless Headset" (or similar) key on the base of the wired phone (or the button on the BLUETOOTH headset 504), audio would be redirected by the smart BLUETOOTH interface gateway 100 through to the BLUETOOTH headset 504.

Alternatively, the BLUETOOTH interface gateway 100 may be attached in lieu of the wired handset by physically plugging into the RJ11 or similar handset jack.

While the invention has been shown and described with reference to the provision of a wireless phone with a BLUETOOTH headset capability, the principles relate equally to wired phones. For instance, a smart BLUETOOTH interface gateway device may be placed in the handset plug of a wired phone to sense audio activity (or may be switched in and out of use by the activation of a button on the wired phone's base).

Thus, in accordance with the principles of the present invention, non-BLUETOOTH enabled phones (wired or wireless) may be augmented with the benefits of a wireless BLUETOOTH headset.

While the invention has been described with reference to the exemplary embodiments thereof, those skilled in the art will be able to make various modifications to the described embodiments of the invention without departing from the true spirit and scope of the invention.

What is claimed is:

1. A device to enable BLUETOOTH communications between a wireless BLUETOOTH headset and a non-BLUETOOTH enabled device, comprising:
   a BLUETOOTH front end;
   a analog-to-digital codec to communicate with an analog audio path output from said non-BLUETOOTH enabled device and said BLUETOOTH front end; and
   an activity detector, in communication with said codec, to sense audio activity output by said non-BLUETOOTH enabled device.

2. The device to enable BLUETOOTH communications between a wireless BLUETOOTH headset and a non-BLUETOOTH enabled device according to claim 1, wherein:
   said activity detector is adapted to distinguish an end of a call.

3. The device to enable BLUETOOTH communications between a wireless BLUETOOTH headset and a non-BLUETOOTH enabled device according to claim 1, wherein:
   said activity detector includes an audible ring tone detector to distinguish a ring tone.

4. The device to enable BLUETOOTH communications between a wireless BLUETOOTH headset and a non-BLUETOOTH enabled device according to claim 1, wherein:
   said activity detector detects analog audio activity output from an external jack of said non-BLUETOOTH enabled device.

5. The device to enable BLUETOOTH communications between a wireless BLUETOOTH headset and a non-BLUETOOTH enabled device according to claim 4, wherein:
   said non-BLUETOOTH enabled device is a wireless phone.

6. The device to enable BLUETOOTH communications between a wireless BLUETOOTH headset and a non-BLUETOOTH enabled device according to claim 1, wherein:
   said non-BLUETOOTH enabled device is a wireless audio device.

7. The device to enable BLUETOOTH communications between a wireless BLUETOOTH headset and a non-BLUETOOTH enabled device according to claim 1, wherein:
   said activity detector distinguishes digital audio activity output from an external jack of said non-BLUETOOTH enabled device.

8. The device to enable BLUETOOTH communications between a wireless BLUETOOTH headset and a non-BLUETOOTH enabled device according to claim 7, wherein:
   said non-BLUETOOTH enabled device is a wireless phone.

9. The device to enable BLUETOOTH communications between a wireless BLUETOOTH headset and a non-BLUETOOTH enabled device according to claim 1, wherein:
   said non-BLUETOOTH enabled device is a wireless phone.

10. The device to enable BLUETOOTH communications between a wireless BLUETOOTH headset and a non-BLUETOOTH enabled device according to claim 9, wherein:
    said wireless phone is a cell phone.

11. A method of terminating a call between a BLUETOOTH headset and a wireless phone, said method comprising:
    digitizing an analog output audio stream output from said wireless phone;
    distinguishing an end of a call by detecting a termination of digitized audio activity on an audio path from said wireless phone; and
    transmitting a signal relating to the termination of the call to a BLUETOOTH headset.

12. The method of terminating a call between a BLUETOOTH headset and a wireless phone according to claim 11, wherein:
    said end of said call is detected by a detection of an absence of an audio signal in said audio path.

13. The method of terminating a call between a BLUETOOTH headset and a wireless phone according to claim 12, wherein:
    said wireless phone is a non-BLUETOOTH enabled wireless phone.

14. A method of initiating establishment of a BLUETOOTH audio channel between a BLUETOOTH headset and a non-BLUETOOTH enabled device, comprising:
    digitizing an analog audio output channel output from said non-BLUETOOTH enabled device;
    monitoring said digitized analog audio output for audible activity; and
    initiating an establishment of said analog audio channel based on detection of digitized audible activity from said non-BLUETOOTH enabled device.

15. The method of initiating establishment of a BLUETOOTH audio channel between a BLUETOOTH headset and a non-BLUETOOTH enabled device according to claim 14, further comprising:
    distinguishing a ring tone in said digitized analog audio output channel.

16. The method of initiating establishment of a BLUETOOTH audio channel between a BLUETOOTH headset and a non-BLUETOOTH enabled device according to claim 15, further comprising:
    terminating said established audio channel based on a detection of cessation of said digitized audible activity.

17. The method of initiating establishment of a BLUETOOTH audio channel between a BLUETOOTH headset and a non-BLUETOOTH enabled device according to claim 14, wherein:
    said non-BLUETOOTH enabled device is a wireless phone.

18. The method of initiating establishment of a BLUETOOTH audio channel between a BLUETOOTH headset and a non-BLUETOOTH enabled device according to claim 17, wherein:
    said non-BLUETOOTH enabled device is a non-BLUETOOTH enabled wireless phone.

19. Apparatus for terminating a call between a BLUETOOTH headset and a wireless phone, comprising:
    means for digitizing an analog output audio stream output from said wireless phone;
    means for distinguishing an end of a call by detecting a termination of digitized audio activity on an audio path from said wireless phone; and means for transmitting a signal relating to said detected termination of said call to a BLUETOOTH headset.

20. Apparatus for initiating establishment of a BLUETOOTH audio channel between a BLUETOOTH headset and a non-BLUETOOTH enabled device, comprising:

means for digitizing an analog audio output channel from said non-BLUETOOTH enabled device;

means for monitoring said digitized analog audio output for audible activity; and means for initiating establishment of said analog audio channel based on a detection of digitized audible activity from said non-BLUETOOTH enabled device.

* * * * *